(12) United States Patent
Yang et al.

(10) Patent No.: US 9,551,431 B2
(45) Date of Patent: Jan. 24, 2017

(54) GASEOUS SAMPLE INJECTION VALVE AND GASEOUS SAMPLE INJECTION METHOD USING SAME

(75) Inventors: Mo Yang, Daejeon (KR); Seung Yong Kim, Daejeon (KR); Hyun Sik Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 372 days.

(21) Appl. No.: 14/358,859

(22) PCT Filed: Nov. 18, 2011

(86) PCT No.: PCT/KR2011/008837
§ 371 (c)(1),
(2), (4) Date: May 16, 2014

(87) PCT Pub. No.: WO2013/073728
PCT Pub. Date: May 23, 2013

(65) Prior Publication Data
US 2014/0312255 A1   Oct. 23, 2014

(51) Int. Cl.
*G01N 30/20*  (2006.01)
*F16K 31/06*  (2006.01)
*H01J 49/04*  (2006.01)
*F16K 11/20*  (2006.01)
*F16K 11/24*  (2006.01)

(52) U.S. Cl.
CPC ......... *F16K 31/0658* (2013.01); *F16K 11/207* (2013.01); *F16K 11/24* (2013.01); *H01J 49/0422* (2013.01); *H01J 49/0495* (2013.01)

(58) Field of Classification Search
None
See application file for complete search history.

(56) References Cited

U.S. PATENT DOCUMENTS

| | | | |
|---|---|---|---|
| RE35,824 E * | 6/1998 | Welker | ........................ 73/863.83 |
| 6,066,848 A | 5/2000 | Kassel et al. | |
| 6,309,600 B1 | 10/2001 | Hunter | |
| 6,812,030 B2 | 11/2004 | Ozbal et al. | |
| 6,841,774 B1 | 1/2005 | Weiss | |

(Continued)

FOREIGN PATENT DOCUMENTS

KR   10-2009-0110246 A   10/2009

*Primary Examiner* — Robert R Raevis
(74) *Attorney, Agent, or Firm* — Rabin & Berdo, P.C.

(57) ABSTRACT

The present invention relates to a gaseous sample injection valve. The gaseous sample injection valve includes a middle body injecting a fixed amount of a gaseous sample into the vacuum chamber of a mass spectrometer, the middle body being constituted by a gaseous sample injection tube, a gaseous sample discharge tube, a storage part, and a vacuum chamber connection tube; an upper body accommodating a first solenoid coil, a first plunger, and a first packing; and a lower body accommodating a second solenoid coil, a second plunger, and a second packing. The gaseous sample injection valve according to the present invention may be miniaturized to utilize a lightweight portable mass spectrometer. Also, the vacuum pump may be reduced in load to extend the operation life-cycle of the vacuum pump. In addition, when the gaseous sample is analyzed by using the mass spectrometer, a uniform mass spectrum with respect to the gaseous sample may be obtained.

7 Claims, 6 Drawing Sheets

(56) References Cited

U.S. PATENT DOCUMENTS

| | | |
|---|---|---|
| 6,932,939 B2 | 8/2005 | Qzbal et al. |
| 7,588,725 B2 | 9/2009 | Ozbal et al. |
| 8,119,983 B2 | 2/2012 | Ochiai et al. |
| 2002/0001544 A1 | 1/2002 | Hess et al. |
| 2002/0160521 A1 | 10/2002 | Ozbal et al. |
| 2003/0119193 A1 | 6/2003 | Hess et al. |
| 2004/0219071 A1 | 11/2004 | Ozbal et al. |
| 2005/0123970 A1 | 6/2005 | Ozbal et al. |
| 2005/0194318 A1 | 9/2005 | Ozbal et al. |
| 2009/0261245 A1 | 10/2009 | Ochiai et al. |
| 2010/0024527 A1 | 2/2010 | LaMarr et al. |
| 2010/0056717 A1 | 3/2010 | Suddaby et al. |
| 2010/0237235 A1 | 9/2010 | Ozbal et al. |
| 2010/0256010 A1 | 10/2010 | Ozbal et al. |

* cited by examiner

GASEOUS SAMPLE INJECTION VALVE AND GASEOUS SAMPLE INJECTION METHOD USING SAME

TECHNICAL FIELD

The present invention relates to a gaseous sample injection valve and a gaseous sample injection method using the same, and more particularly, to a gaseous sample injection valve which may consistently inject a predetermined uniform amount of a gaseous sample into a compact and movable mass spectrometer using a solenoid, and a gaseous sample injection method using the same.

BACKGROUND ART

Generally, a mass spectrometer is used to analyze a gaseous sample. To inject the gaseous sample into the mass spectrometer, a gaseous sample injection valve which may inject the gaseous sample into a chamber of the mass spectrometer which is in a vacuum state is needed.

To analyze the gaseous sample, it is necessary to inject the gaseous sample corresponding to $1\times10^{-4}$ to $1\times10^{-5}$ torr with respect to a volume of the chamber which is in the vacuum state. In a method of injecting the gaseous sample into the vacuum chamber, there are a method which increases flow resistance using a conventional capillary tube or an orifice and reduces a gas injection amount, and a method in which an auxiliary pump is provided at a gas inlet port so that most of the gaseous sample is divided and discharged and only part of the gaseous sample is injected.

Meanwhile, it is necessary to reduce a size and a weight of the mass spectrometer to allow the mass spectrometer to be movable in order to analyze a surrounding atmosphere or because of difficulty in moving the gaseous sample, etc. Since this movable mass spectrometer is driven by a battery, it is necessary to inject the gaseous sample using a solenoid valve operated by a pulse signal in order to reduce a load of a vacuum pump having great power consumption.

However, in a conventional gaseous sample injection, the method using the capillary tube or the orifice has a limitation in a process of reducing a size of a device. Further, when the gaseous sample is injected through the dividing and discharging process, the pump is added to a sample injection device, and thus it is difficult to reduce a size of the device Further, in the conventional art, when a minute amount of the gaseous sample is injected using the solenoid valve, an amount of the injected gaseous sample is not constant, and thus an ion concentration of a mass spectrum, which is measured from the vacuum chamber, is not constant either, and a gaseous component analysis is affected.

DISCLOSURE

Technical Problem

The present invention is directed to providing a gaseous sample injection valve in which a plunger is moved up and down by springs, and a magnetic field generated when an electric current is applied to a solenoid coil, and thus a gaseous sample is injected into and stored in a storage part through a gaseous sample injection tube, and the gaseous sample stored at a predetermined amount in the storage part is injected into a vacuum chamber of a mass spectrometer, and a gaseous sample injection method using the same.

Also, the present invention is directed to providing a gaseous sample injection valve in which only a predetermined amount of a gaseous sample is injected so as to increase reliability in measuring a mass spectrometer when injecting the sample into a movable and compact mass spectrometer and performing a mass analysis, and a load of a vacuum pump is reduced using a solenoid valve through a pulse signal so that the vacuum pump is also used in the compact mass spectrometer and has a low battery power consumption, and a gaseous sample injection method using the same.

Technical Solution

One aspect of the present invention provides an gaseous sample injection valve including a middle body formed in a hollow cylinder shape or polygonal pillar shape, and including a gaseous sample injection tube formed by opening one side of an outer surface thereof to form a tubular passage and through which an external gaseous sample is introduced, a gaseous sample discharge tube formed by opening another side of the outer surface thereof to form a tubular passage and configured to define a gas discharge passage through which the gaseous sample injected through the gaseous sample injection tube is discharged, a storage part formed therein to store part of the gaseous sample injected through the gaseous sample injection tube, and a vacuum chamber connection tube formed by opening another side of the outer surface to form a gaseous sample injection passage, such that the gaseous sample stored in the storage part is injected into a vacuum chamber of a mass spectrometer; an upper body having a lower end opened in the hollow cylinder shape or polygonal pillar shape, disposed on the middle body, and having a flange formed by bending a part of the lower end outward; a first solenoid coil formed to enclose an upper portion of the upper body; a first plunger received in the upper body to be moved up by a magnetic field generated from the first solenoid coil; a first spring installed between an upper surface of a flange of the first plunger and a lower surface of the flange formed in the upper body to be used to move a first plunger down; a first packing disposed at a center of a lower surface of the first plunger and in close contact with an upper end of the storage part when the first plunger is moved downward; a lower body having an upper end opened in the hollow cylinder shape or polygonal pillar shape, disposed under the middle body, and having a flange formed by bending a part of the upper end outward; a second solenoid coil formed to enclose a lower portion of the lower body; a second plunger received in the lower body to be moved down by a magnetic field generated from the second solenoid coil; a second spring installed between a lower surface of a flange of the second plunger and an upper surface of the flange formed in the lower body to be used to move a second plunger up; and a second packing disposed at a center of an upper surface of the second plunger and in close contact with a lower end of the storage part when the second plunger is moved upward.

The gaseous sample injection valve may further include a first stator received in an upper portion of the upper body and installed to be spaced a predetermined distance from an upper portion of the first plunger and also to restrict upward movement of the first plunger; and a second stator received in a lower portion of the lower body and installed to be spaced a predetermined distance from a lower portion of the second plunger and also to restrict downward movement of the second plunger.

The gaseous sample injection valve may further include a first case configured to cover the first solenoid coil, and a second case configured to cover the second solenoid coil.

The gaseous sample injection valve may further include an O-ring inserted into an upper surface of the middle body to be in contact with a lower surface of the flange of the upper body.

The storage part may have a size of 0.1 nanoliters to 10 microliters.

Another aspect of the present invention provides a gaseous sample injection method using a gaseous sample injection valve, including a first process of moving a first plunger downward by first spring when an electric current is not applied to a first solenoid coil, closing an upper end of a storage part by a first packing of the first plunger, and closing a lower end of the storage part by the second packing of the second plunger; a second process of moving a second plunger downward by a magnetic field generated when the electric current is applied to a second solenoid coil, and injecting a gaseous sample from a gas discharge passage to the storage part; a third process of moving the second plunger upward by second spring when the electric current is not applied to the second solenoid coil, closing a lower end of the storage part by the second packing, and closing the storage part in which the gaseous sample is injected; a fourth process of moving the first plunger upward by the magnetic field generated when the electric current is applied to the first solenoid coil, opening the upper end of the storage part by the first packing of the first plunger to form a gas injection passage, and forcibly injecting the gaseous sample stored in the storage part into a vacuum chamber of a mass spectrometer by a pressure difference. After the fourth process, the processes may be repeated from the first process.

Advantageous Effects

Since the gaseous sample injection valve according to the present invention is manufactured to be compact, a portable mass spectrometer having a reduced size and weight can be provided. Since the load of the vacuum pump is reduced and the battery power consumption is also reduced, the operation life-cycle of the vacuum pump can be extended. Since only the predetermined amount of the gaseous sample can be injected into the vacuum chamber of the mass spectrometer, the uniform mass spectrum with respect to the gaseous sample can be obtained.

MODES OF THE INVENTION

Hereinafter, exemplary embodiments of the present invention will be described in detail.

Figure 1:
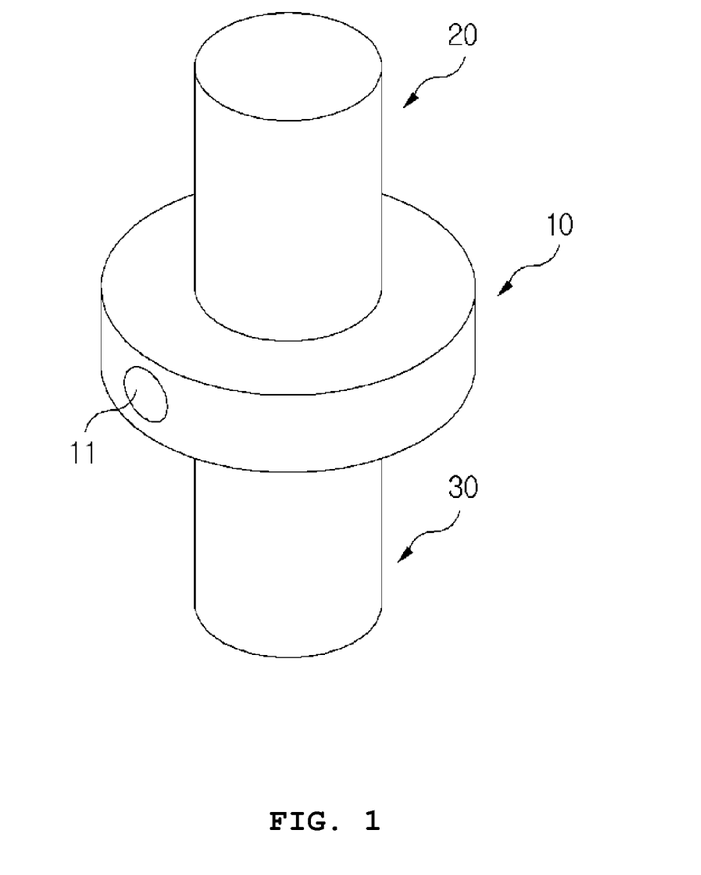
FIG. 1 is a view schematically illustrating an exterior of a gaseous sample injection valve according to the present invention.
Figure 2:
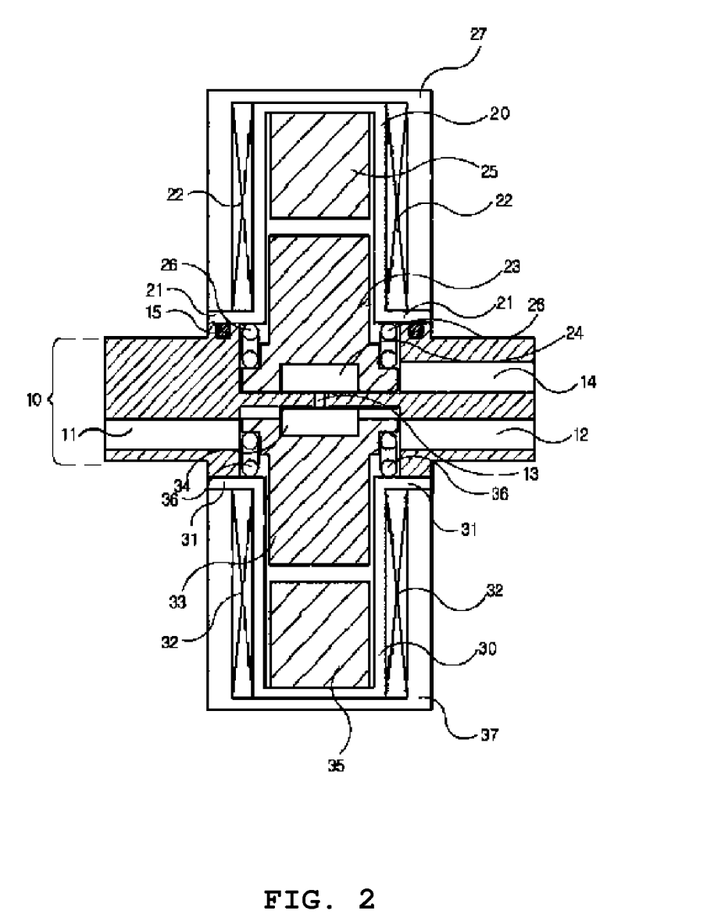
FIG. 2 is a longitudinal cross-sectional view of the gaseous sample injection valve according to the present invention.

Referring to FIGS. 1 and 2, a gaseous sample injection valve according to the present invention is divided into an upper portion, a middle portion and a lower portion which form an upper body 20, a middle body 10 and a lower body 30, respectively. The middle body 10 includes a gaseous sample injection tube 11, a gaseous sample discharge tube 12, a storage part 13 and a vacuum chamber connection tube 14. The upper body 20 receives a first solenoid coil 22, a first plunger 23 and a first packing 24, and the lower body 30 receives a second solenoid coil 32, a second plunger 33 and a second packing 34.

The middle body 10 has a hollow cylinder shape or polygonal pillar shape.

The gaseous sample injection tube 11 is formed by opening one side of an outer surface of the middle body 10 so that a tubular passage is formed in the middle body 10. Further, an external gaseous sample is injected into the middle body 10 through the gaseous sample injection tube 11.

The gaseous sample discharge tube 12 is formed by opening another side of the outer surface of the middle body 10 so that a tubular passage is formed in the middle body 10. Further, a gas discharge passage P1 through which the gaseous sample injected through the gaseous sample injection tube 11 is discharged is defined.

The storage part 13 is formed in the middle body 10, and part of the gaseous sample injected through the gaseous sample injection tube 11 is stored therein.

The storage part 13 may have a size of 0.1 nanoliters to 10 microliters. The gaseous sample injection valve configured to have the storage part 13 having a size appropriate for a size and an allowable limit of the vacuum chamber (not shown) or a vacuum pump (not shown) may be selected. Air injected into the vacuum chamber (not shown) may be injected at a pressure which is lower than a pressure of $1\times10$ torr (more preferably, $1\times10^{-4}$ to $1\times10^{-5}$ torr). Notwithstanding the above limitation on the size of the storage part 13, the storage part 13 having a size beyond the range of 0.1 nanoliters to 10 microliters may be manufactured or used if necessary.

The vacuum chamber connection tube 14 is formed by opening yet another side of the outer surface of the middle body 10 so that a tubular passage is formed in the middle body 10, and thus a gaseous sample injection passage P2 is formed. Therefore, only a predetermined amount of the gaseous sample stored in the storage part 13 may be injected into the vacuum chamber (not shown) of the mass spectrometer.

An O-ring 15 in contact with a flange 21 of the upper body 20 may be inserted into an upper surface of the middle body 10.

The upper body 20 has a lower end which is opened in the hollow cylinder shape or polygonal pillar shape, a lower end of the upper body 20 is opened and disposed on the middle body 10, and part of the lower end is bent outward to form the flange 21.

The upper body 20 includes a first spring 26. The plurality of first springs 26 are installed between an upper surface of a flange of the first plunger 23 and a lower surface of the flange 21 formed in the upper body 20.

The first solenoid coil 22 is formed to enclose an upper portion of the upper body 20.

The first plunger 23 is received in the upper body 20, and protrudes into the opened lower end of the upper body 20.

The first packing 24 is inserted into a center of a lower surface of the first plunger 23, may form a plane together with the lower surface of the first plunger 23, and is in close contact with an upper end of the storage part 13 when the first plunger 23 is moved downward.

In addition, the first packing 24 may be formed to be inserted into the lower surface of the first plunger 23 and to protrude to a lower side of the first plunger 23.

The upper body 20 may further include a first stator 25. The first stator 25 is received in an upper portion of the upper body 20 and installed to be spaced a predetermined distance from an upper portion of the first plunger 23 and also to restrict upward movement of the first plunger 23.

Meanwhile, a first case 27 configured to cover the first solenoid coil 22 may be provided at an outer surface of the first solenoid coil 22.

The lower body 30 has an upper end which is opened in the hollow cylinder shape or polygonal pillar shape, an upper end thereof is opened and disposed under the middle body 10, and part of the upper end is bent outward to form a flange 31.

Further, the lower body 30 may further include a second spring 36. The plurality of second springs 36 may be installed between a lower surface of a flange of the second plunger 33 and an upper surface of the flange 31 formed in the lower body 30, and the number of the second springs 36 is not particularly limited.

The lower body 30 includes a second spring 36. The plurality of second springs 36 are installed between a lower surface of a flange of the second plunger 33 and an upper surface of the flange 31 formed in the lower body 30.

The second solenoid coil 32 is formed to enclose a lower portion of the lower body 30.

The second plunger 33 is received in the lower body 30, protrudes into the opened upper end of the lower body 30.

The second packing 34 is inserted into a center of an upper surface of the second plunger 33, may protrude upward from the upper surface of the second plunger 33, and is in close contact with a lower end of the storage part 13 when the second plunger 33 is moved upward.

In addition, the second packing 34 may be formed to be inserted into the upper surface of the second plunger 33 and to form a plane together with the second plunger 33.

The lower body 30 may further include a second stator 35. The second stator 35 is received in a lower portion of the lower body 30, and installed to be spaced a predetermined distance from a lower portion of the second plunger 33 in and also to restrict downward movement of the second plunger 33.

Meanwhile, a second case 37 configured to cover the second solenoid coil 32 may be provided at an outer surface of the second solenoid coil 32.

The gaseous sample injection valve described above is operated to inject the gaseous sample into the vacuum chamber (not shown), as will be described below.

Figure 3A:
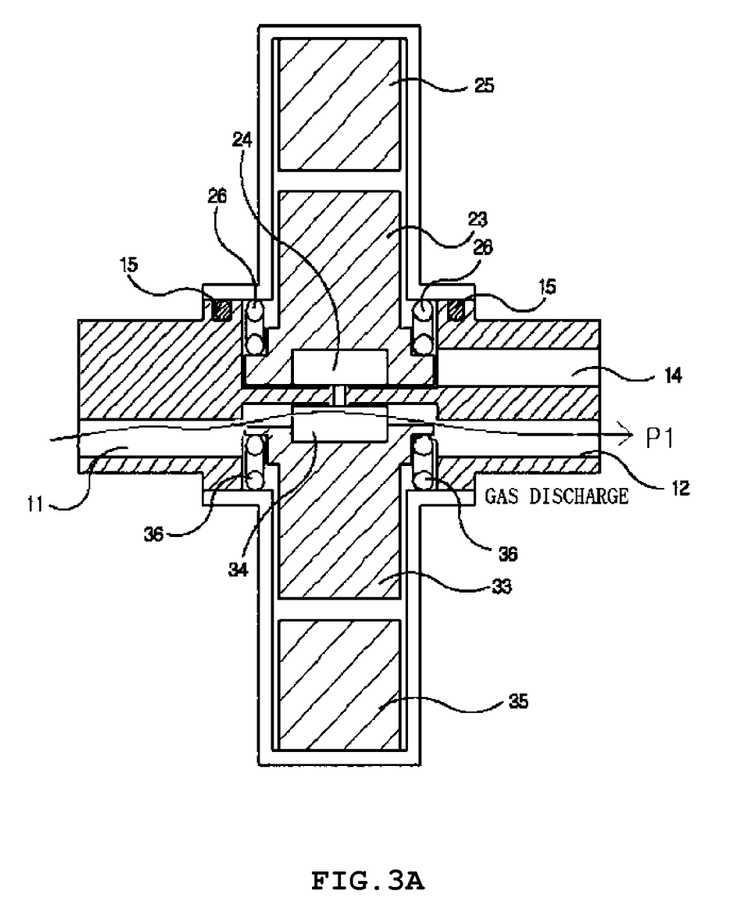
FIG. 3a is a view illustrating a state in which all of storage parts of the gaseous sample injection valve according to the present invention are closed.

As shown in FIG. 3a, when the electric current is not applied to the first solenoid coil 22, the magnetic field is not formed around the first solenoid coil 22. The first plunger 23 is moved downward by the first spring 26, and the first packing 24 located at the lower surface of the first plunger 23 blocks the upper end of the storage part 13 (S1). At this time, the second packing located at the upper surface of the second plunger 33 is in a state of blocking the lower end of the storage part 13.

For reference, the gas discharge passage P1 of FIG. 3a is illustrated as passing through the second packing 34. However, in a state in which the second packing 34 blocks the lower end of the storage part 13, a donut-shaped space is formed around the second packing 34, and thus the gas discharge passage P1 is formed. In other words, the gaseous sample passes through the gaseous sample injection tube 11, detours around the second packing 34, and is discharged through the gaseous sample discharge tube 14, whereby the gas discharge passage P1 is formed.

Figure 3B:
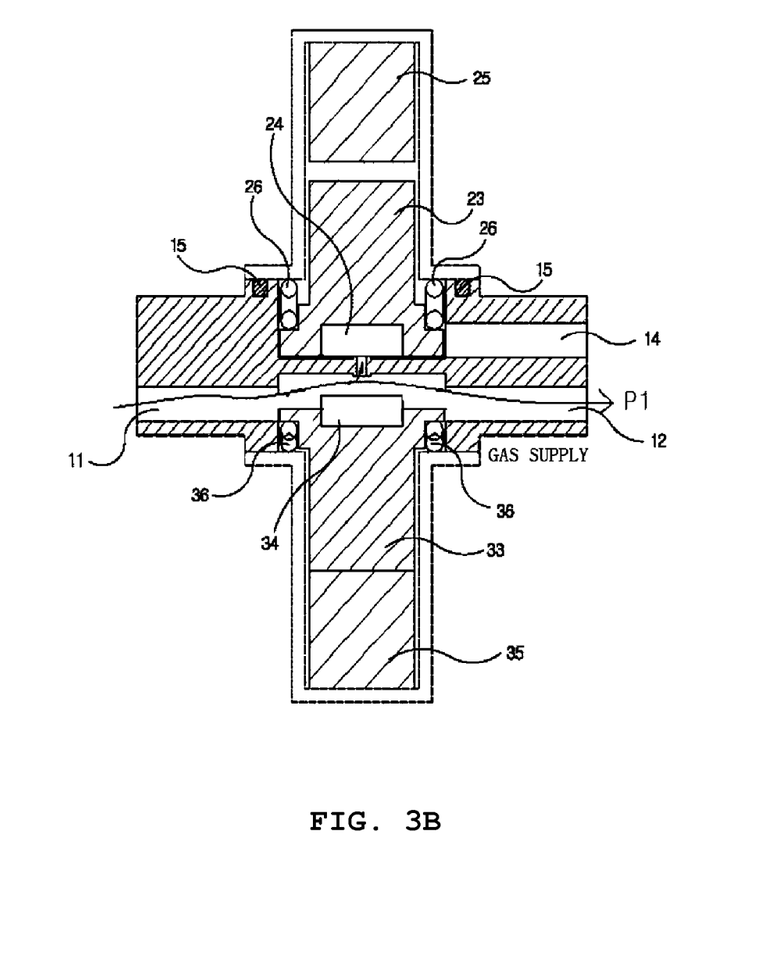
FIG. 3b is a view illustrating a state in which a gaseous sample is injected into the storage part of the gaseous sample injection valve according to the present invention.

Next, as shown in FIG. 3b, the second plunger 33 is also moved downward by the magnetic field generated when the electric current is applied to the second solenoid coil 32, but blocked by the second stator 35. The gaseous sample to be analyzed is injected through the gaseous sample injection tube 11, and part of the gaseous sample is injected into the storage part 13 from the gas discharge passage P1 (S2).

Figure 3C:
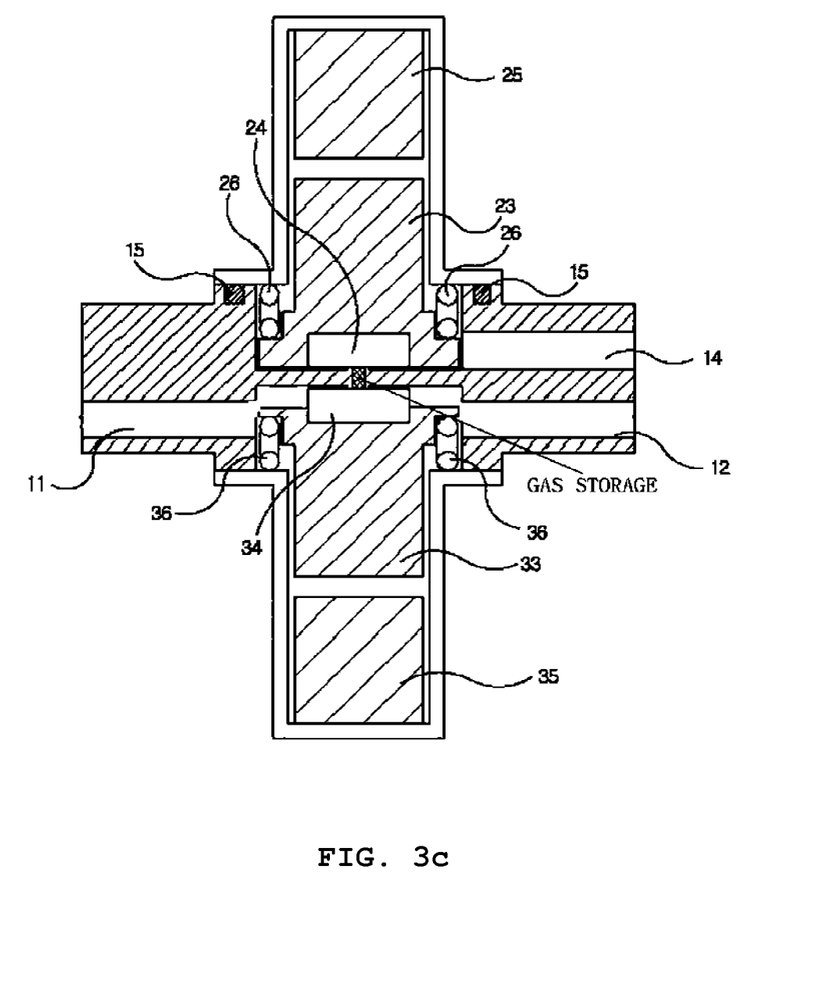
FIG. 3c is a view illustrating a state in which the gaseous sample is stored in the storage part of the gaseous sample injection valve according to the present invention.

Next, as shown in FIG. 3c, the second plunger 33 is also moved upward by the second spring 36 when the electric current is not applied to the second solenoid coil 32, the second packing 34 provided at the upper surface of the second plunger 33 blocks the lower end of the storage part 13, and the part of the gaseous sample is stored in the storage part 13 (S3).

Of course, in this state, since an empty space is formed around the second packing 34, the gas discharge passage P1 is maintained, and most of the gaseous sample is discharged.

Figure 3D:
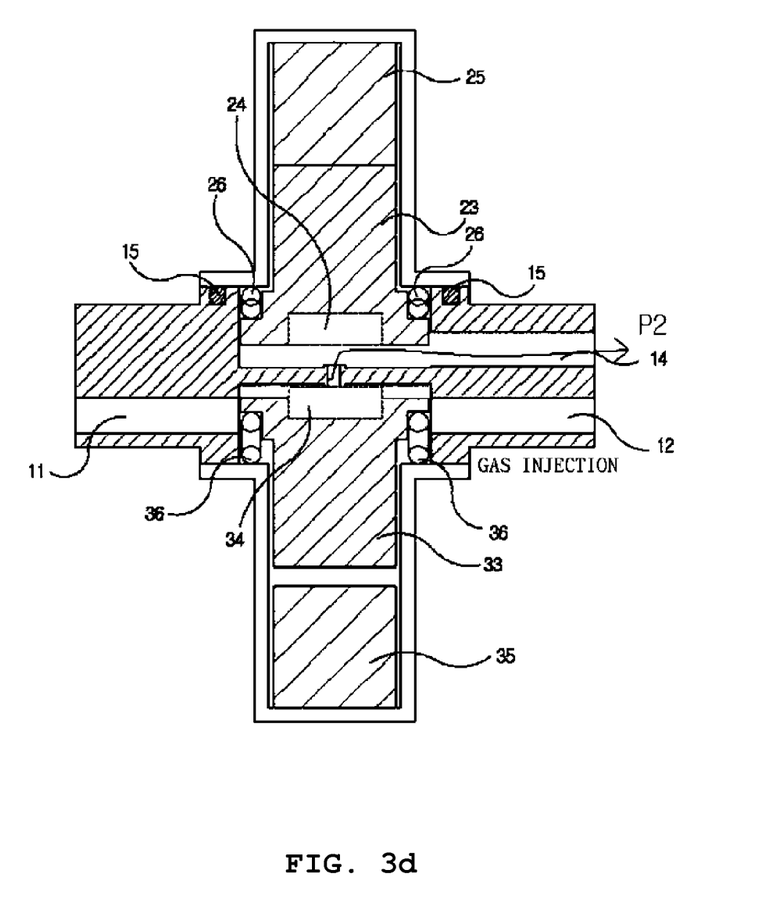
FIG. 3d is a view illustrating a state in which the gaseous sample stored in the storage part of the gaseous sample injection valve according to the present invention flows into a vacuum chamber.

Then, as shown in FIG. 3d, the first plunger 23 is moved upward by the magnetic field generated when the electric current is applied to the first solenoid coil 22 but blocked by the first stator 25, the first packing 24 is separated from the upper end of the storage part 13, the gaseous sample injection passage P2 is formed, and the predetermined amount of the gaseous sample stored in the storage part 13 is injected into the vacuum chamber (not shown) of the mass spectrometer through the vacuum chamber connection tub 14 (S4). The predetermined amount of the gaseous sample in the storage part 13 is discharged to the vacuum chamber (not shown) by a pressure difference from an inner side of the vacuum chamber (not shown) when the first packing 24 is opened.

Then, the first plunger 23 is moved downward again by the first spring 26 when the electric current is not applied to the first solenoid coil 22, the upper end of the storage part 13 is closed by the first packing of the first plunger 23, and thus the storage part 13 is closed (S4, S1).

The processes from FIG. 3a to FIG. 3d may be continuously repeated in the operation of the gaseous sample injection valve according to the present invention.

Meanwhile, in the present invention, since the storage part 13 has a predetermined size regardless of the time when the storage part 13 is opened and closed by the first packing 24 and the second packing 34, the predetermined amount of the gaseous sample is consistently injected into the vacuum chamber (not shown).

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A gaseous sample injection valve comprising:
   a middle body (10) formed in a hollow cylinder shape or polygonal pillar shape, and comprising a gaseous sample injection tube (11) formed by opening one side of an outer surface thereof to form a tubular passage and through which an external gaseous sample is introduced, a gaseous sample discharge tube (12) formed by opening another side of the outer surface thereof to form a tubular passage and configured to define a gas discharge passage (P1) through which the gaseous sample injected through the gaseous sample injection tube (11) is discharged, a storage part (13) formed therein to store part of the gaseous sample injected through the gaseous sample injection tube (11), and a vacuum chamber connection tube (14) formed by opening said another side of the outer surface of the middle body (10) to form a gaseous sample injection passage (P2), such that the gaseous sample stored in the storage part (13) is injected into a vacuum chamber of a mass spectrometer;

an upper body (20) formed in a hollow cylinder shape or polygonal pillar shape having a lower end opened, the upper body (20) being disposed on the middle body (10), and having a flange (21) formed by bending a part of the lower end outward;

a first solenoid coil (22) formed to enclose an upper portion of the upper body (20);

a first plunger (23) received in the upper body (20) to be moved upward by a magnetic field generated from the first solenoid coil (22);

a first spring (26) installed between an upper surface of a flange of the first plunger (23) and a lower surface of the flange (21) of the upper body (20) to move the first plunger (23) downward;

a first packing (24) disposed at a center of a lower surface of the first plunger 23 and in close contact with an upper end of the storage part (13) when the first plunger (23) is moved downward;

a lower body (30) formed in a hollow cylinder shape or polygonal pillar shape having an upper end opened, the lower body (30) being disposed under the middle body (10), and having a flange (31) formed by bending a part of the upper end outward;

a second solenoid coil (32) formed to enclose a lower portion of the lower body (30);

a second plunger (33) received in the lower body (30) to be moved downward by a magnetic field generated from the second solenoid coil (32);

a second spring (36) installed between a lower surface of a flange of the second plunger (33) and an upper surface of the flange (31) formed in the lower body (30) to move the second plunger (33) upward; and a second packing (34) disposed at a center of an upper surface of the second plunger (33) and in close contact with a lower end of the storage part (13) when the second plunger (33) is moved upward.

2. The valve of claim 1, further comprising a first stator (25) received in an upper portion of the upper body (20) and installed to be spaced a predetermined distance from an upper portion of the first plunger (23) and also to restrict upward movement of the first plunger (23); and a second stator (35) is received in a lower portion of the lower body (30) and installed to be spaced a predetermined distance from a lower portion of the second plunger (33) and also to restrict downward movement of the second plunger (33).

3. The valve of claim 1, further comprising a first case (27) configured to cover the first solenoid coil (22), and a second case (37) configured to cover the second solenoid coil (32).

4. The valve of claim 1, further comprising an O-ring (15) inserted into an upper surface of the middle body (10) to be in contact with a lower surface of the flange (21) of the upper body (20).

5. The valve of claim 1, wherein the storage part (13) has a size of 0.1 nanoliters to 10 microliters.

6. A gaseous sample injection method using a gaseous sample injection valve, comprising:

a first process (S1) of moving a first plunger (23) downward by a first spring (26) when an electric current is not applied to a first solenoid coil (22), closing an upper end of a storage part (13) by a first packing (24) of the first plunger (23), and closing a lower end of the storage part (13) by the second packing (34) of the second plunger (33);

a second process (S2) of moving a second plunger (33) downward by a magnetic field generated when the electric current is applied to a second solenoid coil (32), and injecting a gaseous sample from a gas discharge passage (P1) to the storage part (13);

a third process (S3) of moving the second plunger (33) upward by a second spring (36) when the electric current is not applied to the second solenoid coil (32), closing a lower end of the storage part (13) by the second packing (34), and closing the storage part (13) in which the gaseous sample is injected; and a fourth process (S4) of moving the first plunger (23) upward by the magnetic field generated when the electric current is applied to the first solenoid coil (22), opening the upper end of the storage part (13) by the first packing (24) of the first plunger (23) to form a gas injection passage (P2), and forcibly injecting the gaseous sample stored in the storage part (13) into a vacuum chamber.

7. The method of claim 6, wherein, after the fourth process (S4), the processes are repeated from the first process (S1).

* * * * *